Aug. 21, 1962     J. F. J. BOURGUIGNON     3,050,631
DEVICE FOR ENERGIZING A TIMEPIECE, INCLUDING
AT LEAST ONE PHOTOELECTRIC CELL
Filed Dec. 14, 1960     3 Sheets-Sheet 1
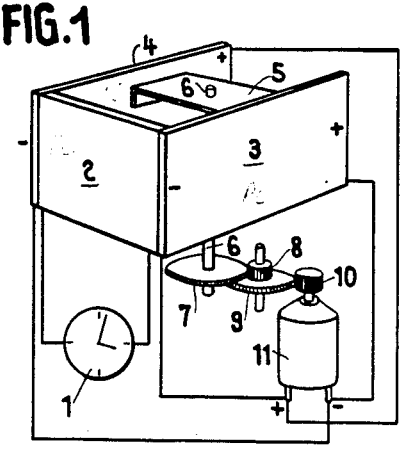
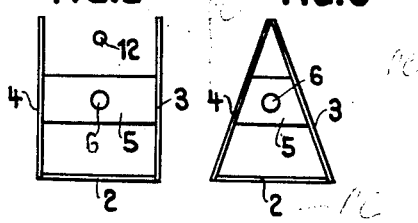
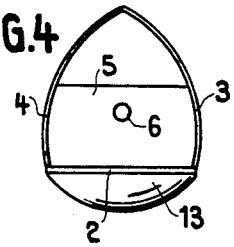
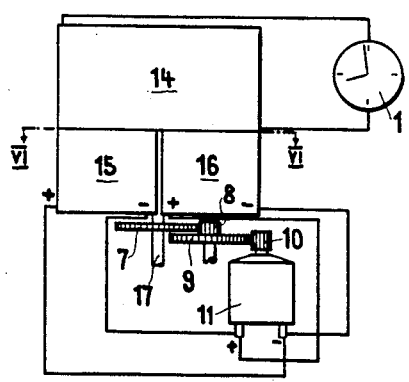
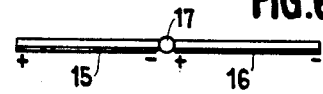
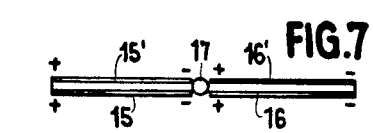
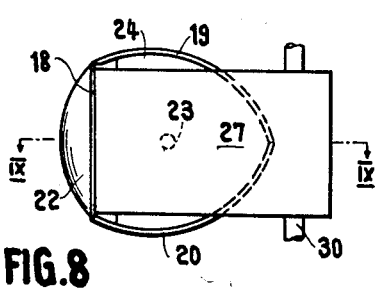
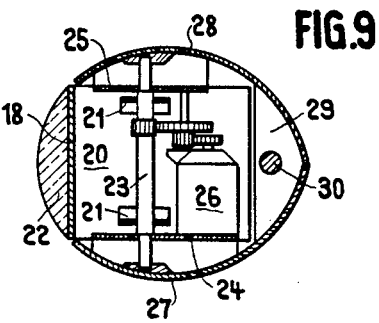
INVENTOR
Jules Florent Joseph Bourguignon
BY
ATTORNEYS

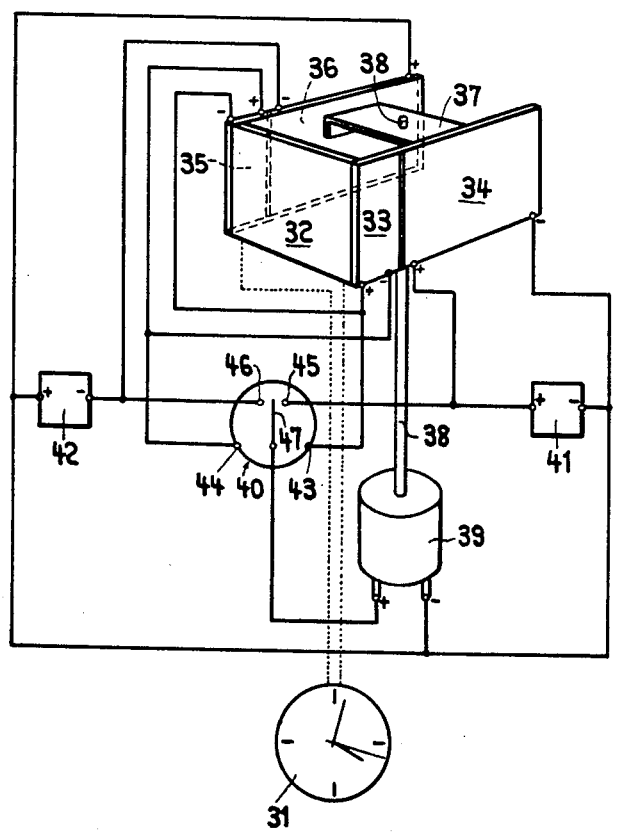

Aug. 21, 1962    J. F. J. BOURGUIGNON    3,050,631
DEVICE FOR ENERGIZING A TIMEPIECE, INCLUDING
AT LEAST ONE PHOTOELECTRIC CELL

Filed Dec. 14, 1960            3 Sheets-Sheet 3

INVENTOR
Jules Florent Joseph Bourguignon
BY
ATTORNEYS

United States Patent Office 3,050,631
Patented Aug. 21, 1962

1

3,050,631
DEVICE FOR ENERGIZING A TIMEPIECE, INCLUDING AT LEAST ONE PHOTOELECTRIC CELL
Jules Florent Joseph Bourguignon, Seilles, Belgium, assignor to Baumgartner Freres S.A., Grenchen, Switzerland
Filed Dec. 14, 1960, Ser. No. 75,869
Claims priority, application Switzerland Dec. 18, 1959
3 Claims. (Cl. 250—203)

The present invention relates to a device for energizing a timepiece, including at least one photoelectric cell. Such timepieces are already known, for instance tableclocks, in which photoelectric cells generate a current as soon as they are exposed to a sufficient light, the said current being utilized either for charging a battery or for driving an electromotor serving to wind a main spring.

It has already been proposed to mount these cells so that they can be oriented manually in order that they receive the greatest amount of light. This known construction has, however, two drawbacks: Firstly, an operator must intervene for orienting the cells, and secondly, the human eye is not sufficiently sensible for ascertaining without error from which direction comes the greatest flux of light.

The present invention aims at overcoming these drawbacks and allows automatically orienting the photoelectric cell or cells provided for energizing the timepiece. The subject matter of the invention is indeed a device for energizing a timepiece, of the type described, said device being characterized in that the said cell is rigidly connected with at least two other photoelectric cells, called orienting cells, connected in opposition to the terminals of an electromotor, the set of cells forming a movable cell assembly rigidly fixed to a spindle adapted to be rotated by the said motor, the whole being arranged in such a way that as the two orienting cells are exposed to light, they generate a current which causes the motor to rotate in the one or the other direction according as the one or the other of the cells receives the greater amount of light, until the movable cell assembly has reached a position of equilibrium, the relative disposition of the cells being chosen in such a manner that for the above mentioned position of equilibrium of the movable cell assembly, the first mentioned cell, adapted to energize the timepiece, receives the maximum amount of light.

The accompanying drawings show schematically and by way of example, some embodiments of the invention.

FIG. 1 is a perspective view of a first embodiment of the invention.

FIG. 2 is a top view thereof, at a reduced scale.

FIGS. 3 and 4 illustrate two modifications corresponding to FIG. 2.

FIG. 5 is an elevation view of a second embodiment of the invention.

FIG. 6 is a view at an enlarged scale, taken along the line VI—VI in FIG. 5.

FIG. 7 shows a modification corresponding to FIG. 6.

FIG. 8 is an elevation view of a third embodiment of the invention.

FIG. 9 is a sectional view taken along the line IX—IX in FIG. 8.

FIG. 10 is a perspective view of a fourth embodiment of the invention.

Figure 11:
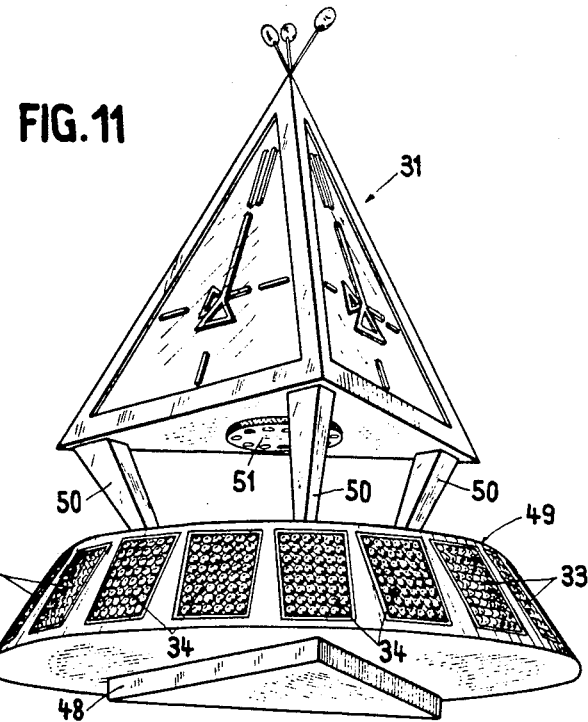
FIG. 11 is a bottom perspective view of a table-clock constructed in accordance with the diagram of FIG. 10.

Referring to FIGS. 1 and 2, the device illustrated serves to energize a timepiece diagrammatically shown as at 1. It includes a first photoelectric cell 2 which is connected by leads to the timepiece 1. It will not be described here how the cell 2 energizes or drives the timepiece 1, since this energization forms no part of the invention. The object of the device hereinafter described is to automatically orienting the cell 2 so that it receives the maximum of light, thus simultaneously guaranteeing the best energization of the timepiece 1.

The cell 2 is rigidly connected with two other photoelectric cells 3 and 4, which are called orienting cells and are arranged in a direction perpendicular to the cell 2. The three cells 2, 3 and 4, therefore, form a rectangle one side of which is missing, when seen from above (FIG. 2). These three cells consist of photovoltaic cells, i.e. they generate a current only when they are illuminated, the electromotive force obtained being proportional to the illumination received.

The cells 3 and 4, which are parallel to each other, are interconnected by cross-pieces 5 (only one of which is illustrated in the drawings), said cross-pieces 5 being rigidly secured to a spindle 6 freely pivoted in a stationary support, not shown. The cell assembly 2 to 4 thus forms a rotatable set adapted to rotate about the axis of the spindle 6. On the spindle 6 is keyed a toothed wheel 7 which meshes with a pinion 8 rigidly connected to a toothed wheel 9, the combined gear 8, 9 being pivoted in the same support as the spindle 6. The wheel 9 engages a pinion 10 driven by an electromotor 11 mounted on the said support.

The positive pole of the cell 3 is connected to the negative pole of the motor 11, whereas the negative pole of the cell 3 is connected to the positive pole of the motor 11. On the other hand, the positive pole of the cell 4 is connected to the positive pole of the motor 11, and the negative pole of the cell 4 is connected to the negative pole of the motor 11. The cells 3 and 4 are therefore connected in opposition to the terminals of the motor 11. Accordingly, when the cell 3 is illuminated, the current generated by it causes the motor 11 to rotate in one direction, and when the cell 4 is exposed to light, the current generated causes the motor 11 to rotate in the opposite direction. In the practice, both cells 3 and 4 simultaneously receive light, but of different intensities. They generate, therefore, electric currents tending to rotate the motor 11 in opposite directions. Thus, the motor 11 will rotate in one direction or the other according as one or the other of the cells 3 and 4 receives the greater amount of light. Through the train of gears 7 to 10, the rotation of the motor 11 is transmitted to the spindle 6 and therefrom to the rotatable cell assembly. It is possible to say that, in the embodiment described, the cells 3 and 4 "flee" before the light, since each of them tends to place itself in a direction parallel to the light rays. The cell assembly thus effects some oscillations and quickly reaches its position of equilibrium in which the cells 3 and 4 receive the minimum of light and therefore the cell 2 receives the maximum of light. A stationary stop 12 (FIG. 2) is provided for preventing the rotatable cell assembly from taking a position turned by 180° with respect to the abovementioned optimum position, since in this second position, which would also be a position of equilibrium, the cell 2 would practically receive no light.

In the modified embodiment illustrated in FIG. 3, the above elements are again to be found, except that the orienting cells 3 and 4 form the equal sides of an isosceles triangle the base of which is constituted by the cell 2. The operation is the same as before, but it is no longer necessary to provide a stationary stop such as 12.

The second modification shown in FIG. 4 differs from the preceding construction in that the orienting cells 3 and 4 are formed by cylinder portions interconnected at their rear ends. In addition, the cell 2 is covered by a magnifying glass 13 serving to increase the light flux falling onto the cell 2.

In the second embodiment (FIGS. 5 and 6), there is again a cell 14 for energizing a timepiece 1, and two cells 15 and 16 for orienting the cell 14 so that the latter receives the maximum of light. However, in the present case, the three cells 14, 15 and 16 are arranged in the same plane, although they are insulated from one another. The cells 14 to 16 again form a rotatable cell assembly rigidly connected with a spindle 17 which can be rotated through a gear train 7 to 10 by the electromotor 11. The cells 15 and 16 are, here too, connected in opposition to the terminals of the motor 11.

The operation of this second embodiment is as follows: When the cell 15 is illuminated, the current generated by it causes the motor 11 to rotate in one direction, and when the cell 16 is exposed to light, the current generated causes the motor 11 to rotate in the other direction. Practically, both cells 15 and 16 simultaneously receive light, but of different intensities. They generate, therefore, currents tending to rotate the motor 11 in opposite directions. Consequently, the motor 11 will rotate in the one or the other direction according as one or the other of the cells 15 and 16 receives the larger amount of light. Through the train of gears 7 to 10, the rotation of the motor 11 is transmitted to the spindle 17 and therefore to the rotatable cell assembly. Contrary to what happens in the embodiment of FIGS. 1 to 4, the cells 15 and 16 "seek" the light, since each of them tends to place itself in a direction perpendicular to the light rays. The cell assembly practically effects some oscillations and quickly reaches its position of equilibrium in which the cells 15 and 16 receive the maximum of light, so that the cell 14, adapted to energize the timepiece 1, also receives the maximum of light.

In the modification of FIG. 7, the cells 15 and 16 are doubled as at 15' and 16', respectively, the pairs 15, 15' and 16, 16' being respectively mounted in parallel. The efficiency of the device is thus increased, nothing being changed in the mode of operation.

The third embodiment of the invention, illustrated in FIGS. 8 and 9, permits orienting a cell 18 adapted to energize a timepiece (not shown), not only with respect to one geometrical axis, but with respect to two axes perpendicular to each other. In other words, the cell 18 will now have two degrees of freedom and is capable of seeking the light in any direction of the space so as to pick up the maximum flux of light. The construction practically consists of two devices according to FIG. 4, but mounted in cascade.

The energizing cell 18 is rigidly connected with two orienting cells 19 and 20 of cylindrical shape, which are interconnected by cross-pieces 21. The cell 18 is covered by a magnifying glass 22 serving to increase the flux of light falling on it. The cross-pieces 21 are rigidly secured to a horizontal spindle 23 freely pivoted in supporting plates 24 and 25. To the plate 24 is fixed an electromotor 26 which is connected with the spindle 23 by a train of gears similar to the train of gears 7 to 10 of FIG. 1. The plates 24 and 25 are carried by two orienting cells 27 and 28 of cylindrical shape, respectively, which are similar to the cells 19 and 20, but of larger dimensions. The cells 27 and 28 are interconnected by small plates 29 only one of which is illustrated. The small plates 29 are keyed on a vertical spindle 30 pivoted in a non-illustrated stationary support. The spindle 30 is connected through a train of gears (not shown) to an electromotor similar to the motor 26. The cells 19 and 20 are connected in opposition to the terminals of the motor 26, whereas the cells 27 and 28 are connected in opposition to the terminals of the electromotor actuating the spindle 30.

When the device of FIGS. 8 and 9 is exposed to light, the cells 19 and 20 are oriented about the horizontal spindle 23 so that the cell 18 receives the maximum flux of light, in the manner described for the first embodiment of the invention. Simultaneously, the outer cells 27 and 28 are oriented about the vertical spindle 30, so that the cell 18 may move until it receives the maximum amount of light.

The devices as described and illustrated above may of course be arranged within the casing of the time-piece to be energized. Preferably, the transparent walls of this casing will be made of polarized glass so that the light may enter the glass and act onto the photoelectric cells, but an observer is prevented from seeing the parts arranged inside the casing.

The device of the fourth embodiment (FIG. 10) serves to energize a timepiece diagrammatically shown as at 31, consisting for instance of a table-clock. It includes a first photoelectric cell 32 which is connected by leads shown in dotted lines to the timepiece 31. The cell 32 is rigidly connected with two other photoelectric cells, called orienting cells, arranged in a direction perpendicular to the cell 32. The first orienting cell consists of two juxtaposed sub-cells 33 and 34, called primary and secondary sub-cells, respectively. Similarly, the second orienting cell consists of two juxtaposed sub-cells, viz. the primary sub-cell 35 and the secondary sub-cell 36. Each primary sub-cell is smaller than the corresponding secondary sub-cell, its area being for instance the half or the quarter of that of the secondary sub-cell. The cell 32 and the orienting cells 33, 34 and 35, 36 form, as seen from the top, a rectangle a side of which is missing.

The orienting cells 33, 34 and 35, 36, which are mounted parallel to each other, are interconnected by cross-pieces 37 (only one of which is illustrated), said cross-pieces 37 being rigidly connected with a spindle 38 freely pivoted in a stationary support, not shown. The cells 32 to 36, therefore, form a rotatable cell assembly, which may rotate about the axis of the spindle 38. The spindle 38 is rotated by an electromotor 39 mounted on the support already mentioned. A suitable reducing gear, not shown, is incorporated in the motor 39.

The device of FIG. 10 includes in addition a microswitch generally denoted by the numeral 40, and two condensers 41 and 42. The positive pole of the primary sub-cell 33 is connected on the one hand to the terminal 43 of the microswitch 40 and, on the other hand, to the negative pole of the primary sub-cell 35, whereas the negative pole of the primary sub-cell 33 is connected on the one hand to the terminal 44 of the microswitch 40 and, on the other hand, to the positive pole of the primary sub-cell 35. The primary sub-cells 33 and 35 are therefore, connected in opposition to the terminals 43 and 44 of the microswitch 40.

The positive pole of the secondary sub-cell 34 is connected on the one hand to the positive pole of the condenser 41 and, on the other hand, to the stationary contact 45 of the microswitch 40, whereas the negative pole of the secondary sub-cell 34 is connected on the one hand to the negative pole of the condenser 41 and, on the other hand, to the negative pole of the electromotor 39. Similarly the positive pole of the secondary sub-cell 36 is connected on the one hand to the positive pole of the condenser 42 and, on the other hand, to the negative pole of the electromotor 39, whereas the negative pole of the secondary sub-cell 36 is connected on the one hand to the negative pole of the condenser 42 and, on the other hand, to the stationary contact 46 of the microswitch 40. Finally, the movable contact 47 of the microswitch 40 is connected to the positive pole of the electromotor 39.

When the device described is exposed to light, the secondary sub-cells 34 and 36 charge the condensers 41 and 42, but as long as the movable contact 47 of the microswitch 40 assumes the neutral position shown in FIG. 10, none of the condensers 41 and 42 is connected to the motor 39, so that the latter cannot rotate. If the primary sub-cell 33 is exposed to light, but not the primary sub-cell 35, the current generated actuates the microswitch 40 and brings the movable contact 47 for instance onto the stationary contact 45. The condenser 41 is thus connected into the circuit of the electromotor 39 and causes the latter to rotate in one direction. On the contrary, if the primary sub-cell 35 is illuminated, but not the primary sub-cell 33, the current generated actuates the microswitch 40 and brings the movable contact 47 onto the stationary contact 46. In this case, the condenser 42 feeds the electromotor 39 and causes it to rotate in the reverse direction. Practically, both primary sub-cells 33 and 35 are simultaneously somewhat illuminated, but with different intensities of light. They generate therefore currents tending to rotate the motor 39 in opposite directions. Thus, the motor 39 will rotate in the one or the other direction according as the one or the other of the primary sub-cells 33 and 35 receives the greater amount of light. The rotation of the motor 39 is transmitted to the spindle 38 and therefore to the rotatable cell assembly. It can be said that in the embodiment described the orienting cells 33, 34 and 35, 36 "flee" before the light, since each of them tends to place itself in a direction parallel to the light rays. The cell assembly effects some oscillations and quickly reaches its position of equilibrium in which the orienting cells 33, 34 and 35, 36 receive the minimum amount of light and therefore the energizing cell 32 receives the maximum flux of light. In this position of equilibrium of the cell assembly, the primary sub-cells 33 and 35 receive the same flux of light, so that the movable contact 47 of the microswitch 40 remains in its neutral position shown in FIG. 10 and the motor 39 does not rotate. A stationary stop, not shown, prevents the cell assembly from taking a position turned by 180° with respect to the optimal position mentioned above, since in this second position, which would also be a position of equilibrium, the cell 32 would practically receive no light.

The device of FIG. 10 constitutes in fact an electronic finder or detector with condensed amplification, capable of operating even for very small illuminations, e.g. for illuminations of less than 80 lux. As a matter of fact, the microswitch 40 is chosen so as to react to very small currents, so that the least difference in the illumination between the primary sub-cells 33 and 35 is sufficient for rocking the movable contact 47 of the microswitch 40 towards one side or the other. On the other hand, the condensers 41 and 42 will practically be almost always charged at the maximum, that is to say, to their point of saturation, since the secondary sub-cells 34 and 36 are permanently connected to said condensers and the latter deliver energy only intermittently, when the direction of the incoming light is varied. Therefore, as the movable contact 47 of the microswitch 40 is moved towards the left or the right, the important energy stored in the corresponding condenser suffices for giving a strong impulse to the motor 39 and for rotating the cell assembly. If the cell assembly rotates beyond the position of equilibrium which should be taken, the other condenser will in turn, act and the cell assembly will reach its position of equilibrium after a few oscillations.

The essential idea on which is based the embodiment of FIG. 10 consists in dividing into two parts the function of the orienting cells, the primary sub-cells 33 and 35 only serving to actuate the microswitch 40, which has no work to do and can therefore respond to very small currents, whereas the secondary sub-cells 34 and 36, which have larger dimensions, can impart to the condensers 41 and 42 the energy required for rotating the motor 39 and the cell assembly. This cell assembly may be relatively heavy, particularly if the cells are rigidly fixed to the timepiece 31.

The several modifications above described can of course be adopted here, too. Thus, the orienting cells 33, 34 and 35, 36 might form the equal sides of an isosceles triangle the base of which would consist of the cell 32. These orienting cells might also be formed by cylinder portions interconnected at their rear ends. It would also be possible to arrange all of the cells, viz. the orienting cells and the energizing cell, in the same plane; in this case, contrary to what happens in the above described embodiment, the orienting cells would "seek" the light, since each of them would tend to place itself in a direction perpendicular to the light rays. Finally, by adopting an arrangement similar to that of FIGS. 8 and 9, it would be possible to orient the cell energizing the timepiece, with respect to two axes perpendicular to each other, the said cell then having two degrees of freedom and being capable of seeking the light in any direction of space, so as to pick up the maximum flux of light.

Figure 12:
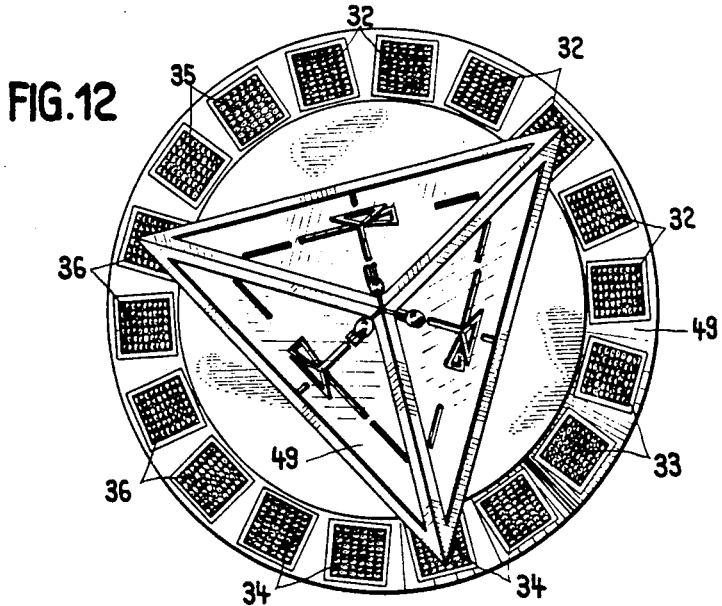
FIG. 12 is a top view of the table-clock illustrated in FIG. 11.

FIGS. 11 and 12 illustrate a practical realization of a table-clock embodying the diagram of FIG. 10. This table-clock has a stationary base 48 adapted to be placed on a table. The base 48 is rigidly connected with a vertical rod, not shown, on which the clock assembly is rotatably mounted. The lower portion of the rotary part consists of a frusto-conical casing 49 the larger base of which is turned downwardly. On the lateral surface of the casing 49 are distributed the several photoelectric cells, which are here in the number of eighteen, but it is evident that this number might be different. The six cells 32 are the energizing cells for the clock; the two cells 33 or 35, respectively, are the primary sub-cells, and the four cells 34 or 36, respectively, are the secondary sub-cells.

The timepiece proper 31 has the shape of a triangular pyramid each face of which has a dial and a set of hands, the three sets of hands being driven from a common clockwork, the latter being in turn energized by the cells 32. The timepiece 31 is maintained on the casing 49 by means of three feet 50 rigidly fixed to the casing 49. Electrical leads connect the energizing cells 32 to the motor of the timepiece 31 and go through one or several of the feet 50. A hand-actuable wheel 51, projecting out of the underside of the pyramid, permits setting the hands of the table-clock.

What I claim is:

1. In a device for energizing a timepiece, including at least one photoelectric cell which is rigidly connected with at least two other photoelectric cells, called orienting cells, the set of cells forming a movable cell assembly rigidly fixed to a spindle adapted to be rotated by an electromotor, the improvement in which each orienting cell consists of two juxtaposed sub-cells, called primary and secondary sub-cells, respectively, the primary sub-cells being connected in opposition to a microswitch, whereas the secondary sub-cells are connected to condensers which are in turn connectable to said electromotor through the movable contact of said microswitch, the whole being arranged in such a way that as both orienting cells are illuminated, the primary sub-cells generate a current which actuates the movable contact of the microswitch in the one or the other direction according as the one or the other of the primary sub-cells receives the greater amount of light, whereas the corresponding condenser thus mounted into the circuit of the motor, which condenser has been previously charged by the corresponding secondary sub-cell, causes the motor to rotate in the one or the other directions according to the position of the movable contact of the microswitch, until the movable cell assembly has reached a position of equilibrium, the relative disposition of the cells being chosen in such a manner that for the above mentioned position of equilibrum of the movable cell assembly, the first mentioned cell, adapted to energize the timepiece, receives the maximum amount of light.

2. A device as claimed in claim 1, in which each primary sub-cell is smaller than the corresponding secondary sub-cell.

3. A device as claimed in claim 1, in which said microswitch is adapted to respond to vary small currents.

References Cited in the file of this patent
UNITED STATES PATENTS
2,913,583   Regnier et al. _____ Nov. 17, 1959